United States Patent [19]

Yokoo et al.

[11] Patent Number: 5,013,132
[45] Date of Patent: May 7, 1991

[54] REAR-PROJECTION TELEVISION
[75] Inventors: Toru Yokoo; Hideki Yamamoto, both of Tokyo, Japan
[73] Assignee: Pioneer Electronic Corporation, Tokyo, Japan
[21] Appl. No.: 563,641
[22] Filed: Aug. 7, 1990
[30] Foreign Application Priority Data Oct. 20, 1989 [JP] Japan ............................ 1-122254[U]

[51] Int. Cl.⁵ .............................................. G03B 21/60
[52] U.S. Cl. .................................................... 350/128
[58] Field of Search .............................. 350/127–129; 60/641.8; 244/30; 356/36, 244, 335

[56] References Cited

U.S. PATENT DOCUMENTS 4,364,532 12/1982 Stark .............................. 60/641.8 X Primary Examiner—Richard A. Wintercorn
Attorney, Agent, or Firm—Sughrue, Mion, Zinn Macpeak & Seas

[57] ABSTRACT

A rear-projection television has a transmission type two-layer screen made up of a Fresnel lens and a lenticular lens stacked together. Between the two lenses is interposed a transparent protective sheet which protects the lenses from wear or score, which would otherwise result from rubbing due to vibrations during shipping. The use of the transparent protective sheet sandwiched between the two lenses permits a series of adjustments and a final inspection on TV to be made with the product screen mounted in the cabinet. This eliminates the need to mount a jig screen identical with the product screen in place of the latter during the adjustments, reducing the overall amount of time spent in the manufacturing process.

2 Claims, 3 Drawing Sheets

FIG. 4

| MATERIAL | PROJECTION LENS AND CRT PROJECTION TUBE FOCUS ADJUSTMENT | CONVERGENCE ADJUSTMENT | WHITE BALANCE ADJUSTMENT | AGING | FINISHING | FINAL INSPECTION | SHIPPING |
|---|---|---|---|---|---|---|---|
| ORIENTED POLYPROPYLENE | R | N | N | — | — | N | — |
| FOAMED POLYETHYLENE | R | R | R | — | — | R | — |

REAR-PROJECTION TELEVISION

BACKGROUND OF THE INVENTION

The present invention relates to a so-called rear-projection television, in which images on a CRT projection tube are projected from the rear onto a transmission type two-layer screen through a projection lens.

One example of a conventional rear-projection TV using a transmission type two-layer screen is shown in FIG. 5. In the figure, reference numeral 11 denotes a cabinet containing a projection CRT and a projection lens; 12 a Fresnel lens formed with a plurality of concentric circular grooves; and 13 a lenticular lens formed with a large number of vertical grooves. The Fresnel lens 12 and the lenticular lens 13, stacked together and secured to the cabinet, form the transmission type two-layer screen.

The transmission type two-layer screen is so constructed as to be able to provide easy-to-see images when they are projected onto a large-sized screen from the rear, i.e., from the side of the screen opposite the viewer. The grooves to produce the desired effects of the Fresnel lens and the lenticular lens are formed in the facing surfaces of these lenses.

Rays of light passing through the peripheral portion of the screen, remote from the light axis at the screen center, are converged by the Fresnel lens 12 toward the viewer in front of the screen. The lenticular lens 13 widens the horizontal directional characteristic of the screen so that the brightness will be uniform over the entire lateral range of the screen.

To prevent any color misalignment of the image, the Fresnel lens 12 and the lenticular lens 13 are precisely aligned in position before being installed into the cabinet 11 during manufacture and assembly.

With projection TVs using such a two-layer screen, however, there are some drawbacks. Because TV sets are subjected to vibrations during transport, the grooved surfaces of the contacting Fresnel and lenticular lenses are rubbed against each other to form fine wear particles, which adhere to the inside of the screen staining it. When delivered to the user and set up, the rear-projection TV, though a new product, may produce blurred images with reduced brightness and clarity or color misalignment caused by the fine particles in the screen that disturb the projected rays of light.

A common practice to prevent this is to put a protective sheet made of such material as foamed polyethylene between the Fresnel lens and the lenticular lens to protect the opposing surfaces of the two lenses and thereby prevent the formation of fine wear particles.

The manufacturing process for the projection TV of this kind includes adjusting and inspection, such as a projection lens focus adjustment, a CRT projection tube focus adjustment, a convergence adjustment, a white balance adjustment and a final inspection. These adjustment processes require a test image to be projected onto the screen.

However, in the conventional projection televisions with the above-mentioned protective sheet of such material as foamed polyethylene inserted in the screen between the Fresnel and lenticular lenses, a jig screen identical to the product screen must be used during the TV adjustment processes because of the opaqueness of the protective sheet, resulting in an increase in the amount of work and time required for the manufacture.

SUMMARY OF THE INVENTION

It is therefore an object of this invention to provide a rear-projection television, which has a protective sheet sandwiched between the Fresnel lens and the lenticular lens so as to protect the screen against adverse effects from vibrations during transport and which is able to undergo a series of adjustments with the product screen mounted to the cabinet, thereby reducing the overall manufacturing time.

To achieve the above objective, the rear-projection television of this invention comprises: a transmission type two-layer screen made up of a Fresnel lens and a lenticular lens stacked together; a transparent protective sheet interposed between the Fresnel lens and the lenticular lens; and an opening provided near the edge of the Fresnel lens and the lenticular lens to allow the protective sheet to be pulled out.

BRIEF DESCRIPTION OF THE DRAWINGS

FIG. 4 is a diagram showing comparison between the embodiment and a conventional projection TV in terms of whether a jig screen needs to be used in each of the adjustment and inspection processes.

DESCRIPTION OF THE PREFERRED EMBODIMENTS

Figure 1:
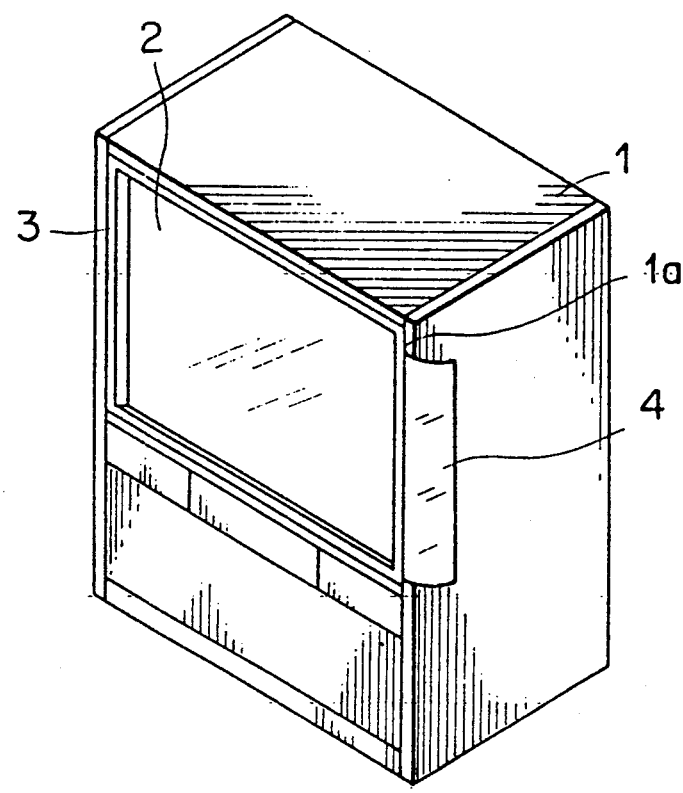
FIG. 1 is a perspective view showing one embodiment of a rear-projection television according to this invention.

FIG. 1 shows a perspective view of a rear-projection television as one embodiment of this invention.

In the figure, reference numeral 1 signifies a cabinet containing a CRT projection tube, a projection lens, an optical reflecting mirror, acoustic speakers, and the like; 2 a transmission type two-layer screen; and 3 a frame to secure the transmission type screen 2 to the cabinet 1.

Denoted 4 is a transparent protective sheet made of two-axis oriented polypropylene, which is reinforced by being stretched in two orthogonal directions. This protective sheet 4 is put inside the transmission type screen 2 with one end sticking out through an opening 1a, which is formed in one side of the peripheral portion of the cabinet 1 enclosing the frame 3.

Figure 2:
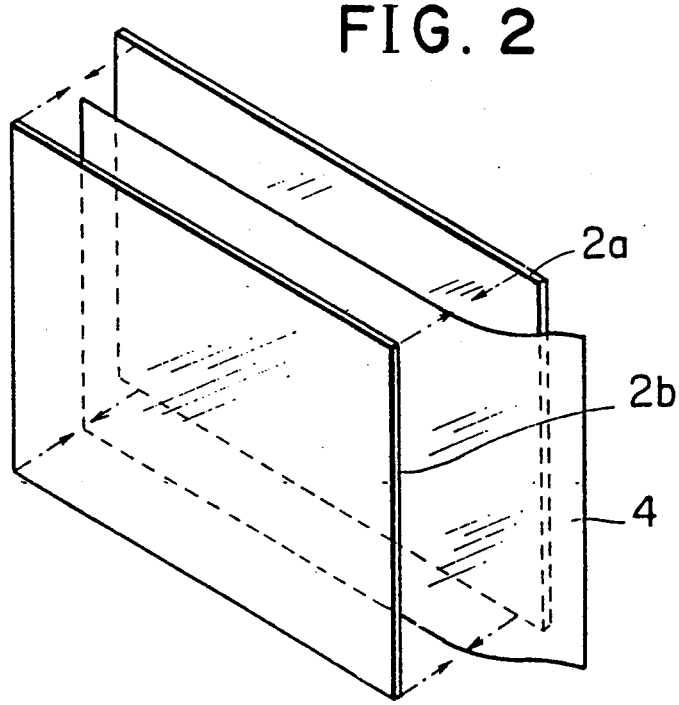
FIG. 2 is a perspective view showing the structure of a transmission type screen of the embodiment.

FIG. 2 shows the structure of the transmission type screen 2, in which 2a is a Fresnel lens formed with concentric grooves and 2b is a lenticular lens formed with a large number of vertical grooves.

The Fresnel lens 2a and the lenticular lens 2b are stacked together with the protective sheet 4 interposed therebetween. The two lenses are secured together as by adhesive tape at the upper and lower sides thereof. One end of the protective sheet 4 is made to stick out from one side of the Fresnel and lenticular lenses 2a and 2b.

Figure 3:
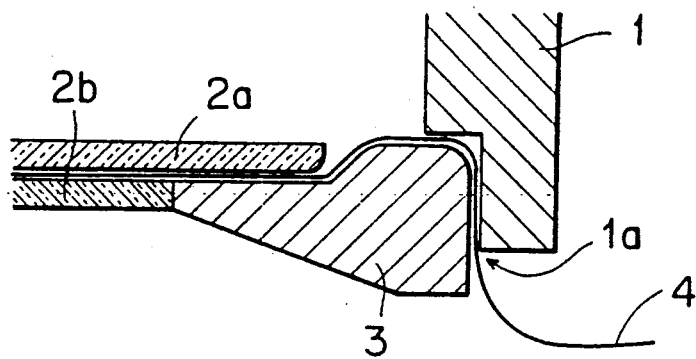
FIG. 3 is a partial cross section showing an opening portion and a protective sheet in the embodiment.
Figure 5:
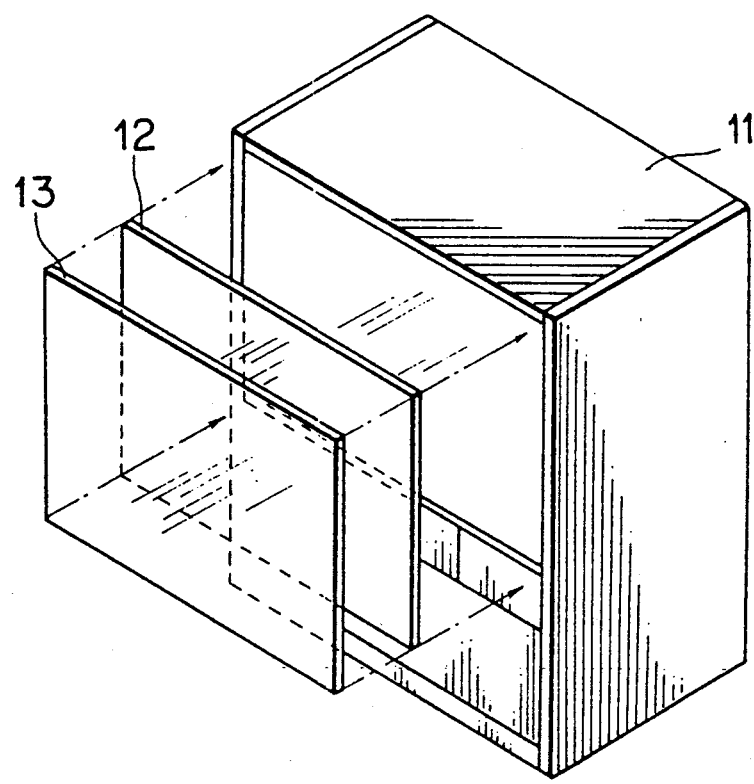
FIG. 5 is a schematic perspective view of a conventional rear-projection TV.

When, as shown in FIG. 1, the frame 3 is mounted in the cabinet 1, the transmission type screen 2 is also fixed to the cabinet 1. As shown in FIG. 3, the opening 1a (or gap) is formed on one side of the frame 3 between the cabinet 1 and the frame 3.

The protective sheet 4 placed between the Fresnel lens 2a and the lenticular lens 2b, therefore, can be withdrawn from the frame 3 through the opening 1a, passing the inside of the cabinet 1.

The use of the protective sheet between the Fresnel and lenticular lenses prevents these lenses from rubbing against each other, which would otherwise result from vibrations during shipping.

When the projection TV is used, the end of the protective sheet projecting from one side of the cabinet is pulled out to remove the sheet.

FIG. 4 compares the projection TV of this invention with a transparent two-axis oriented polypropylene sheet and the conventional projection TV with a foamed polyethylene sheet, in terms of whether a jig screen has to be used in each of the adjustment and inspection processes during manufacture. The letter "R" in the figure indicates the process requiring a jig screen and "N" indicates the process which does not require a jig screen.

As shown in the figure, the manufacturing process for the conventional projection TVs with foamed polyethylene sheets requires the use of a jig screen for the projection lens focus adjustment, CRT projection tube focus adjustment, convergence adjustment, white balance adjustment and the final inspection.

In the manufacturing process for the projection TVs of this invention using the transparent two-axis oriented polypropylene sheets, however, the jig screen is required only for the focus adjustment of the projection lens and the CRT projection tube. During the convergence adjustment, white balance adjustment and final inspection, the transmission type screen 2 secured to the cabinet 1 can be used instead of the jig screen in making adjustments.

While in the above embodiment the two-axis oriented polypropylene film is used as a protective sheet, it is also possible to use a transparent, flexible sheet of other material that is strong enough so that it will not be broken when pulled out and which is easily bent or folded without scoring the Fresnel and lenticular lenses or the cabinet.

As described above, since the rear-projection television according to this invention has a transparent protective sheet interposed between the Fresnel lens and the lenticular lens, the lenses can be prevented from rubbing against each other, which would otherwise result from vibrations during transport. Moreover, the transparent protective sheet allows the product screen to be used during adjustment and inspection in the manufacturing process, thus eliminating the need to replace it with the jig screen and reducing the overall manufacturing time.

What is claimed is:
1. A rear-projection television comprising:
    a transmission type two-layer screen made up of a Fresnel lens and a lenticular lens stacked together;
    a transparent protective sheet interposed between the Fresnel lens and the lenticular lens; and
    an opening provided near the edge of the Fresnel lens and the lenticular lens to allow the protective sheet to be pulled out.
2. A rear-projection television as claimed in claim 1, wherein said transparent protective sheet is a transparent sheet made of two-axis oriented polypropylene.

* * * * *

REEXAMINATION CERTIFICATE (1820th)
United States Patent [19]
Yokoo et al.

[11] B1 5,013,132
[45] Certificate Issued  Oct. 20, 1992

[54] REAR-PROJECTION TELEVISION

[75] Inventors: Toru Yokoo; Hideki Yamamoto, both of Tokyo, Japan

[73] Assignee: Pioneer Electronic Corporation, Tokyo, Japan

Reexamination Request:
No. 90/002,653, Feb. 24, 1992

Reexamination Certificate for:
Patent No.: 5,013,132
Issued: May 7, 1991
Appl. No.: 563,641
Filed: Aug. 7, 1990

[51] Int. Cl.⁵ ............................................. G03B 21/60
[52] U.S. Cl. ................................................ 359/457
[58] Field of Search ....................... 359/443, 457, 460; 358/231, 250, 255

[56] References Cited
U.S. PATENT DOCUMENTS
4,710,820  12/1987  Roberts ........................... 358/231

Primary Examiner—Richard A. Wintercorn

[57] ABSTRACT

A rear-projection television has a transmission type two-layer screen made up of a Fresnel lens and a lenticular lens stacked together. Between the two lenses is interposed a transparent protective sheet which protects the lenses from wear or score, which would otherwise result from rubbing due to vibrations during shipping. The use of the transparent protective sheet sandwiched between the two lenses permits a series of adjustments and a final inspection on TV to be made with the product screen mounted in the cabinet. This eliminates the need to mount a jig screen identical with the product screen in place of the latter during the adjustments, reducing the overall amount of time spent in the manufacturing process.

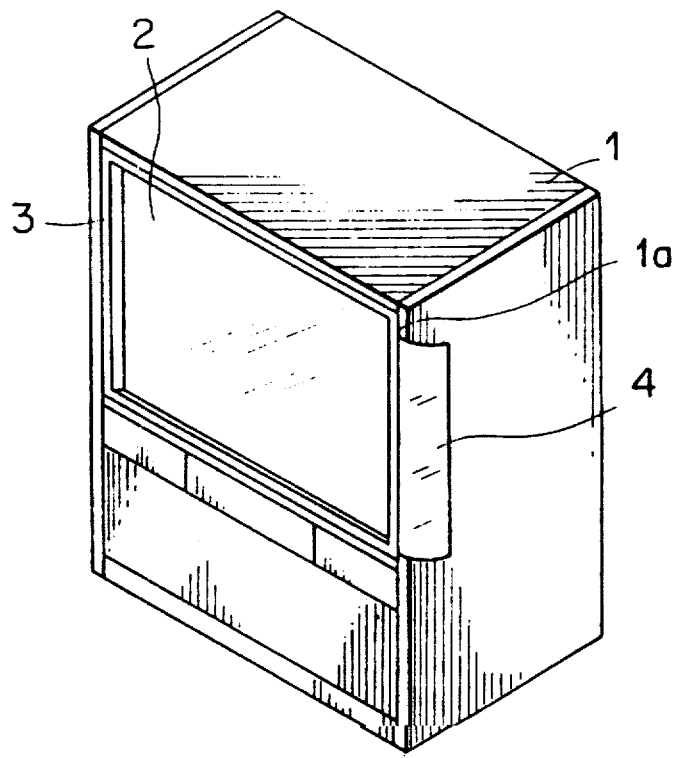

REEXAMINATION CERTIFICATE ISSUED UNDER 35 U.S.C. 307

NO ADMENDMENTS HAVE BEEN MADE TO THE PATENT

AS A RESULT OF REEXAMINATION, IT HAS BEEN DETERMINED THAT:

The patentability of claims 1 and 2 is confirmed.

* * * * *